United States Patent
Jensen

(10) Patent No.: US 7,573,948 B2
(45) Date of Patent: Aug. 11, 2009

(54) RADIO TRANSMITTER INCORPORATING DIGITAL MODULATOR AND CIRCUITRY TO ACCOMMODATE BASEBAND PROCESSOR WITH ANALOG INTERFACE

(75) Inventor: Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 649 days.

(21) Appl. No.: 10/992,570

(22) Filed: Nov. 18, 2004

(65) Prior Publication Data

US 2006/0104383 A1 May 18, 2006

(51) Int. Cl.
*H04L 27/00* (2006.01)
(52) U.S. Cl. .................. 375/295; 375/377; 455/73; 455/126
(58) Field of Classification Search ............ 375/295, 375/219; 340/855.5; 367/137; 455/24
See application file for complete search history.

(56) References Cited

U.S. PATENT DOCUMENTS

| | | | | |
|---|---|---|---|---|
| 3,745,248 A | * | 7/1973 | Gibson | 375/360 |
| 5,469,115 A | * | 11/1995 | Peterzell et al. | 330/129 |
| 5,550,869 A | * | 8/1996 | Gurantz et al. | 375/340 |
| 5,608,357 A | * | 3/1997 | Ta et al. | 331/57 |
| 6,240,073 B1 | * | 5/2001 | Reichman et al. | 370/319 |
| 6,408,034 B1 | * | 6/2002 | Krone et al. | 375/285 |
| 6,463,266 B1 | * | 10/2002 | Shohara | 455/196.1 |
| 6,954,628 B2 | * | 10/2005 | Minnis et al. | 455/324 |
| 7,020,190 B2 | * | 3/2006 | Sullivan | 375/222 |
| 7,035,595 B1 | * | 4/2006 | Kim et al. | 455/73 |
| 7,072,626 B2 | * | 7/2006 | Hadjichristos | 455/126 |
| 2006/0133228 A1 | * | 6/2006 | Nagai et al. | 369/44.13 |

* cited by examiner

Primary Examiner—Shuwang Liu
Assistant Examiner—Lihong Yu
(74) Attorney, Agent, or Firm—Garlick Harrison & Markison; Holly L. Rudnick

(57) ABSTRACT

A radio frequency (RF) transmitter includes a digital radio processor and a baseband processor. A complex analog-to-digital converter (ADC) within the radio processor provides an analog interface to the baseband processor to receive an analog complex modulated baseband signal and convert the analog complex modulated baseband signal to a digital complex modulated baseband signal. A demodulator within the radio processor demodulates the digital complex modulated baseband signal to recreate the original transmit digital data as a demodulated digital signal. The demodulated digital signal is processed by a digital processor in the radio processor to mitigate the effects of various imperfections in the radio processor circuitry.

14 Claims, 9 Drawing Sheets

RADIO TRANSMITTER INCORPORATING DIGITAL MODULATOR AND CIRCUITRY TO ACCOMMODATE BASEBAND PROCESSOR WITH ANALOG INTERFACE

BACKGROUND

1. Technical Field

The present invention relates to wireless communications and, more particularly, wideband wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

However, with the emergence of low-power, low-voltage CMOS radio processors, imperfections in the CMOS analog transmitter circuitry have required the addition of one or more digital signal pre-processing stages to mitigate the effects of such analog imperfections. The digital signal processing required is usually specific to the particular analog radio transmitter architecture, and therefore, is best implemented as part of the radio processor chip. Since the analog signals output from the baseband processor, which typically include modulated in-phase and quadrature phase components at zero IF, are not well suited for interfacing with a digital processing stage, the optimal baseband processor interface to a CMOS radio processor with substantial digital processing is an all-digital interface. However, until next-generation baseband processors are designed with digital interfaces to the radio processor, digital CMOS radio processors must be able to accommodate analog interfaces.

Thus, a need exists for a digital radio processor architecture capable of accommodating analog baseband interfaces.

SUMMARY OF THE INVENTION

To interface to baseband processors that produce analog complex modulated baseband signals, a radio processor is provided with a digital-to-analog converter that converts the analog complex modulated baseband signal to a digital complex modulated baseband signal, and a demodulator that demodulates the digital complex modulated baseband signal to recreate the original transmit digital data as a demodulated digital signal. The demodulated digital signal is processed by a digital processor to mitigate the effects of various imperfections in the radio processor circuitry.

More specifically, in one embodiment, a digital-to-analog converter in the radio processor receives the analog complex modulated baseband signal from the baseband processor and converts the analog complex modulated baseband signal to a digital complex modulated baseband signal. A demodulator is connected to receive the digital complex modulated baseband signal and demodulate the digital complex modulated baseband signal to produce a demodulated digital signal. The demodulated digital signal is input to a digital processor operable to process the demodulated digital signal and convert the demodulated digital signal to a digitized modulated signal. A digital-to-analog converter (DAC) converts the digitized modulated signal to a continuous waveform signal, and a filter filters the continuous waveform signal to produce a filtered signal. A translational loop converts the filtered signal to a radio frequency (RF) transmit signal for transmission by an antenna.

In a further embodiment, the timing of the digital processor is optimized to enable the digital processor to optimally read the digital data from the demodulator using a timing recovery circuit. The timing recovery circuit receives a control signal from the baseband processor, and activates the digital processor based on a fixed timing relationship between receipt of the control signal at the timing recovery circuit and receipt of the analog modulated baseband signal at the demodulator.

Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
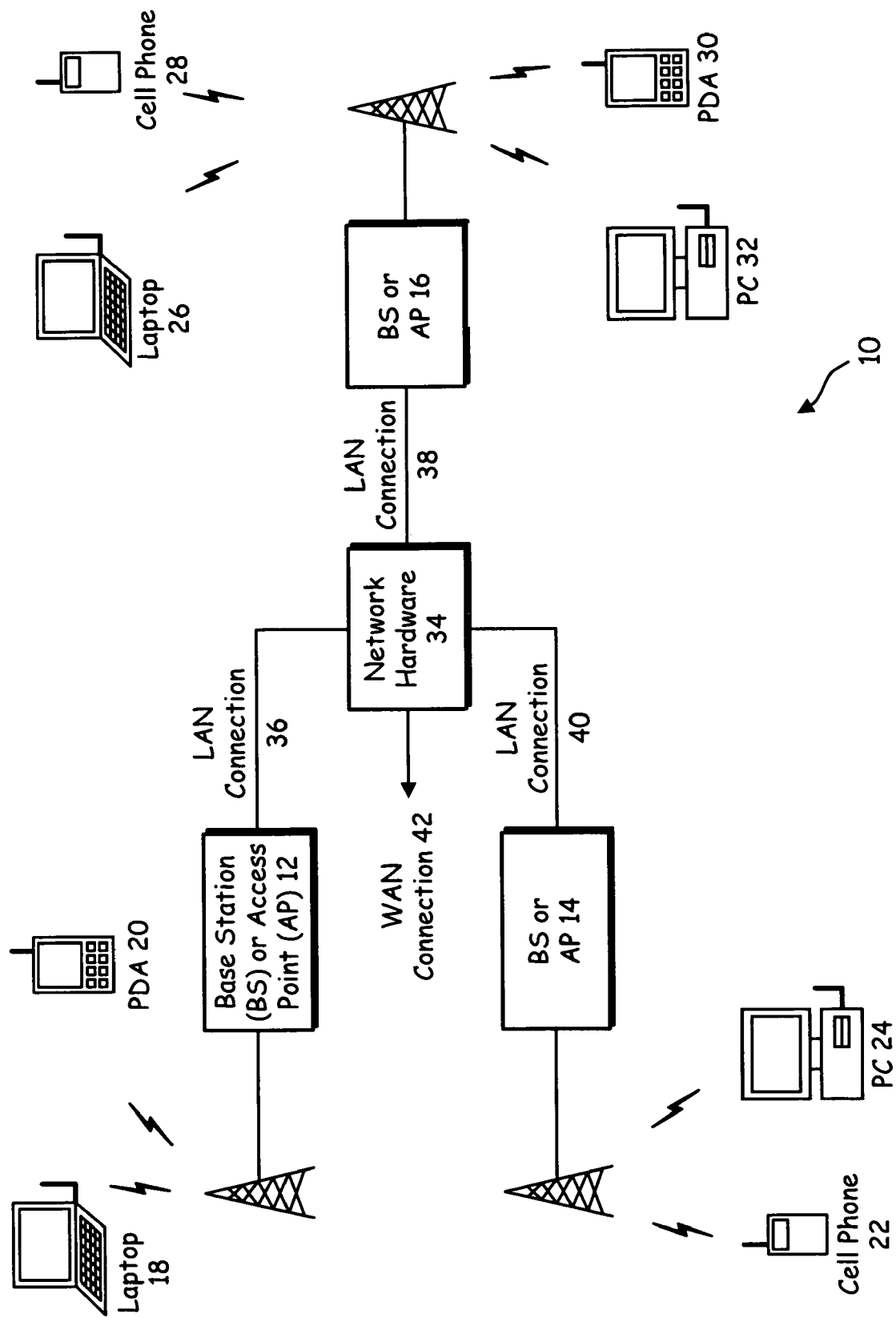
FIG. 1 is a functional block diagram illustrating a communication system that includes a plurality of base stations or access points (APs), a plurality of wireless communication devices and a network hardware component.

FIG. 1 is a functional block diagram illustrating a communication system 10 that includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-9.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
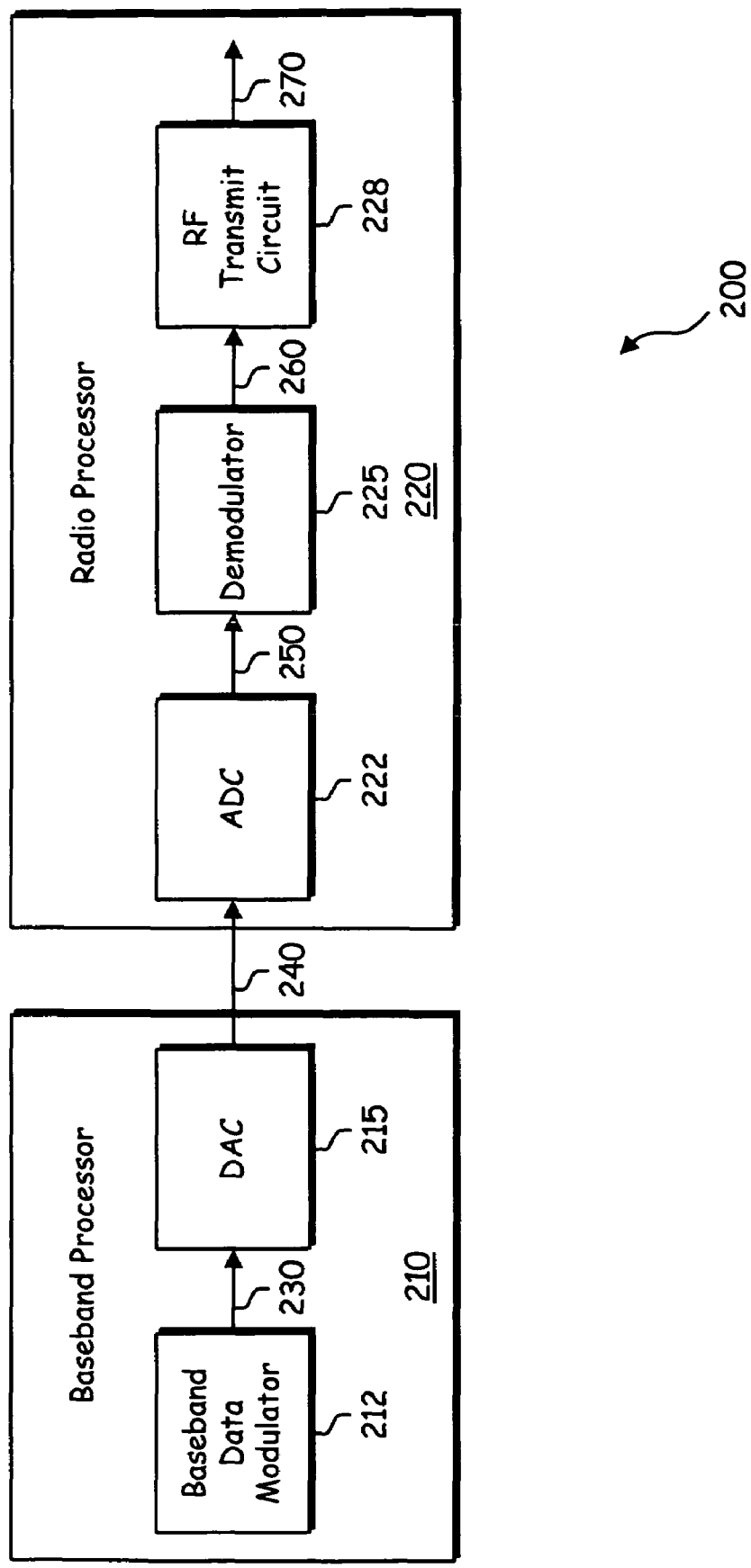
FIG. 2 is a schematic block diagram illustrating a radio frequency (RF) transmitter architecture including a baseband processor and a radio processor according to one embodiment of the present invention.

FIG. 2 illustrates a high-level architecture for a radio frequency (RF) transmitter 200 including a baseband processor 210 and a radio processor 220. The baseband processor 210 and radio processor 220, in combination, provide various functions including, but not limited to, scrambling, encoding, constellation mapping and modulation. The baseband processor 210 and radio processor 220, respectively, may be implemented using individual processing devices, or a plurality of processing devices. Such processing devices may include microprocessors, micro-controllers, digital signal processors, field programmable gate arrays, programmable logic devices, state machine, logic circuitry, analog circuitry, digital circuitry, and/or any device that manipulates signals (analog and/or digital) based on operational instructions. In addition, the RF transmitter 200 may be implemented using one or more integrated circuits. For example, the baseband processor 210 may be implemented on a first integrated circuit (chip), while the radio processor 220 may be implemented on a second integrated circuit.

As shown in FIG. 2, at a high level, the baseband processor 210 includes a baseband data modulator 212 and a digital-to-analog converter (DAC) 215, and the radio processor 220 includes an analog-to-digital converter 222, a demodulator 225 and RF transmit circuitry 228. In operation, the baseband data modulator 212 of the baseband processor 210 receives outgoing transmit data and processes the outgoing data in accordance with a particular wireless communication standard (e.g., IEEE 802.11a, IEEE 802.11b, Bluetooth, etc.) to produce a digital modulated baseband signal 230. The digital-to-analog converter 215 converts the digital modulated baseband signal 230 from the digital domain to the analog domain.

The analog-to-digital converter 222 of the radio processor 220 receives the analog modulated baseband signal 240 and converts the analog modulated baseband signal 240 from the analog domain to the digital domain to reproduce the digital modulated baseband signal 250. The demodulator 225 demodulates the digital modulated baseband signal 250 in accordance with the particular wireless communication standard being implemented by the RF transmitter 200 to produce a demodulated digital signal 260 representing the original outgoing transmit data. The RF transmit circuitry 228 processes the demodulated digital signal 260 to mitigate the effects of imperfections in the RF circuit, re-modulates the processed signal in accordance with the particular wireless communication standard and converts the re-modulated signal from the digital domain to the analog domain to produce an RF signal 270.

Figure 3:
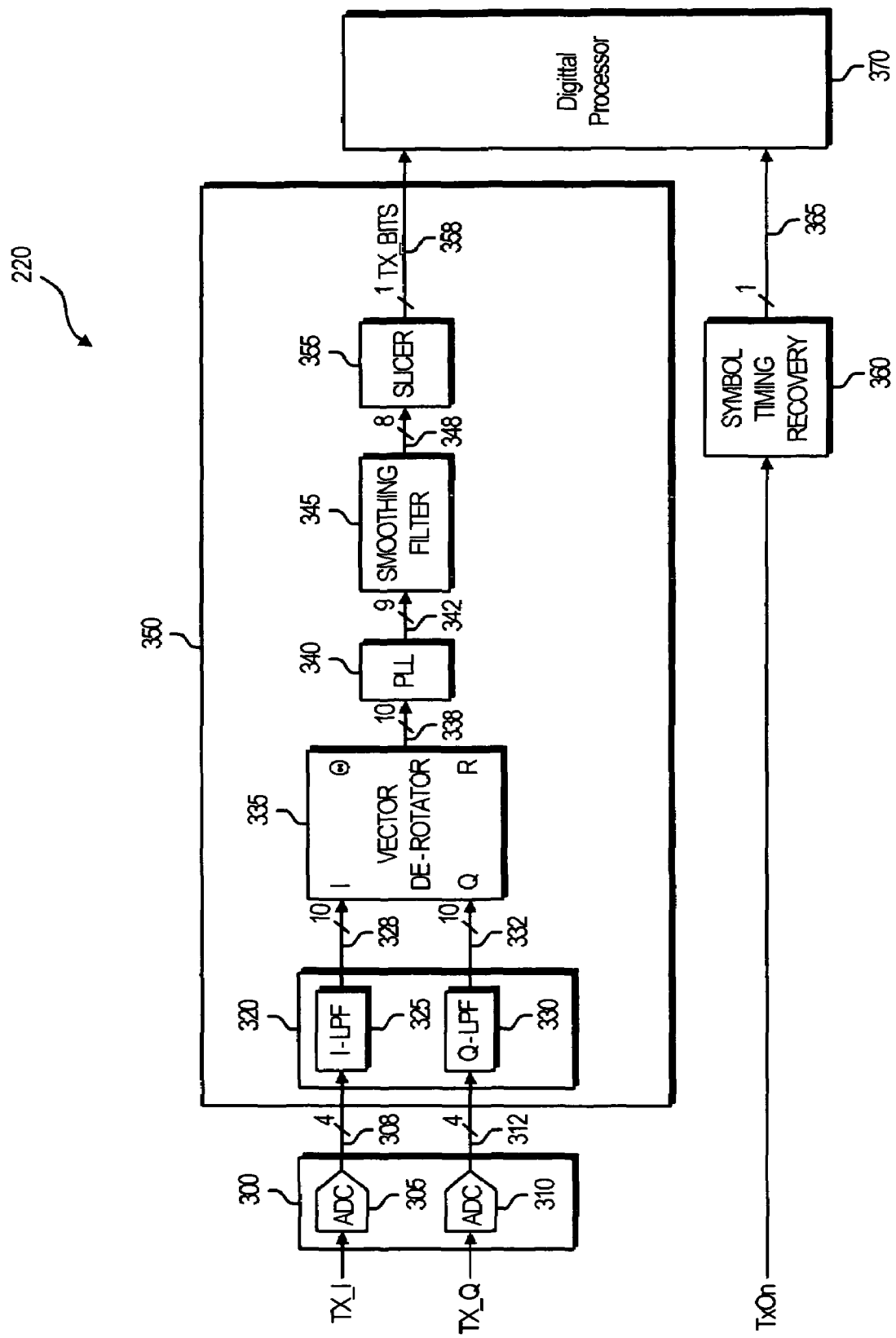
FIG. 3 is a circuit schematic illustrating various components of a radio processor according to one embodiment of the present invention.

FIG. 3 is a circuit schematic illustrating various components of a radio processor 220 according to one embodiment of the present invention. The radio processor 220 includes a complex analog-to-digital converter 300, a demodulator 350, a digital processor 370 and a timing recovery circuit 360. The complex analog-to-digital converter (ADC) 300 is connected to receive an analog complex modulated baseband signal from the baseband processor. The analog complex modulated baseband signal includes analog in-phase and quadrature phase signals, labeled Tx_I and Tx_Q, respectively. The analog in-phase signal Tx_I is received at a first ADC 305 of the complex ADC 300 and the quadrature phase signal Tx_Q is received at a second ADC 310 of the complex ADC 300. The first ADC 305 converts the analog in-phase signal Tx_I from the analog domain to the digital domain to produce a digital in-phase signal. The second ADC 310 converts the analog quadrature phase signal Tx_Q from the analog domain to the digital domain to produce a digital quadrature phase signal.

Figure 4:
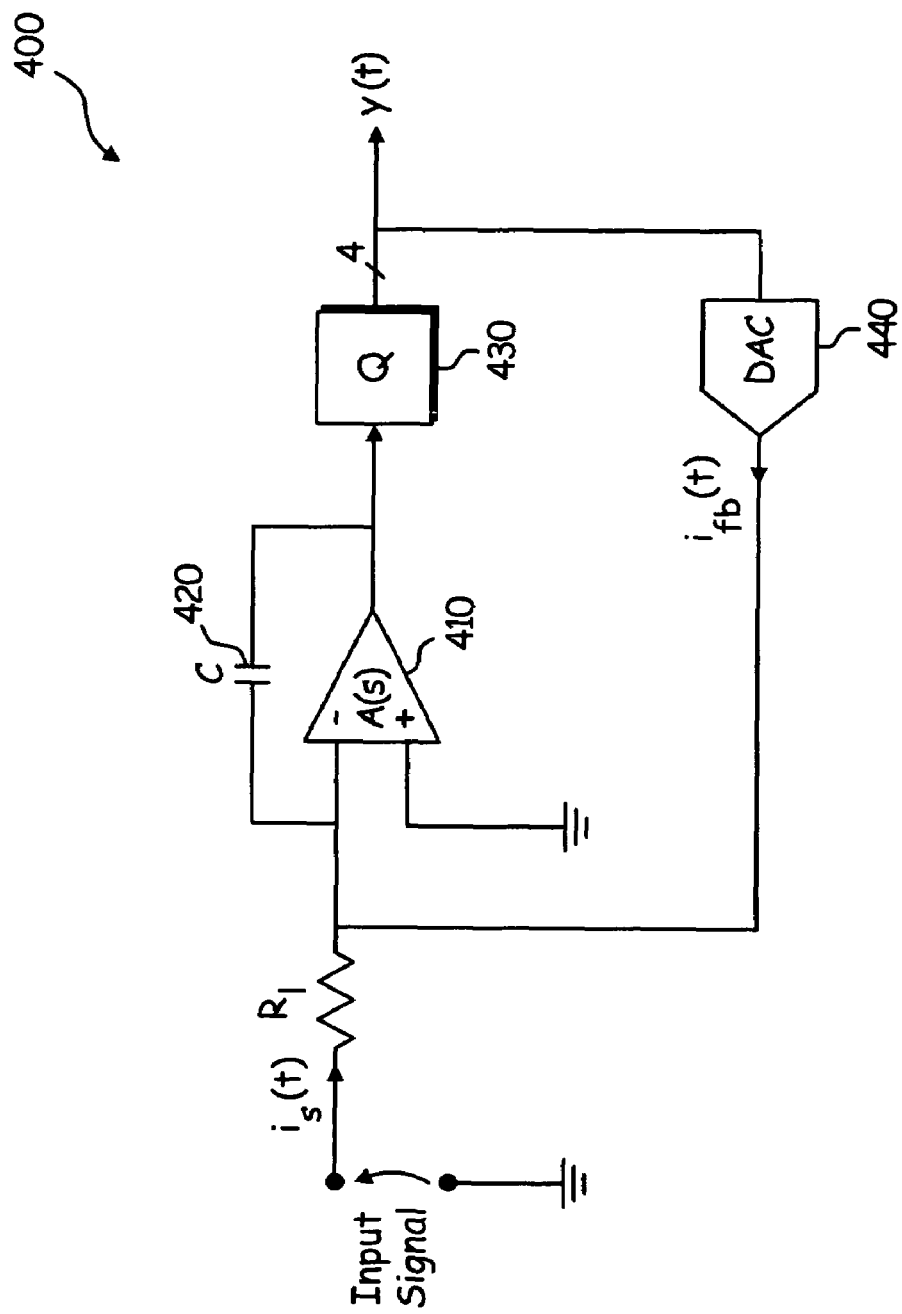
FIG. 4 is a circuit schematic illustrating an exemplary analog-to-digital converter (ADC) for use in the demodulator of the radio processor according to one embodiment of the present invention.

An example of an ADC for converting the analog in-phase or quadrature phase signal from the analog domain to the digital domain is shown in FIG. 4. FIG. 4 illustrates an exemplary delta-sigma ADC 400 that provides a high signal-to-noise ratio (SNR) over a limited bandwidth corresponding to the dominant bandwidth of the analog complex modulated basedband signal. An operational amplifier (op-amp) 410 with negative feedback constitutes an integrator formed by the op-amp 410 and capacitor 420 in the feedback loop. The integrator integrates the input current, labeled $i_s(t)$ flowing from an input signal to produce an analog integrator output voltage. A coarse (in this example 4-bit) quantizer 430 converts the analog integrator output voltage signal to a digital format, shown as y(t). The quantizer 430 includes an array of comparators, essentially 1-bit ADCs, whose output is either "high" or "low" depending upon the magnitude of the integrator voltage relative to a reference signal generated by a reference generator. A digital-to-analog converter (DAC) 440 provides a feedback current responsive to a logic value ("1" or "0") of the ADC output from the quantizer 430.

Referring again to FIG. 3, once the complex ADC 300 has converted the analog complex modulated baseband signal to a digital complex modulated baseband signal, the digital complex modulated baseband signal, made up of the digital in-phase and quadrature-phase signals 308 and 312, respectively, is input to the demodulator 350 to demodulate the digital complex modulated baseband signal. The demodulator 350 includes a complex low pass filter 320, a vector de-rotator 335, a phase locked loop (PLL) 340, a smoothing filter 345 and a slicer 355. The complex low pass filter 320 includes an in-phase low pass filter (I-LPF) 325 and a quadrature-phase low pass filter (Q-LPF) 330. The I-LPF 325 is connected to receive the digital in-phase signal 308 and is operable to filter the digital in-phase signal to produce a first digital filtered signal 328. The Q-LPF 330 is connected to receive the digital quadrature-phase signal 312 and is operable to filter the digital quadrature-phase signal to produce a second digital filtered signal 322. In one embodiment, the complex low pass filter 320 is a decimation filter that both performs low pass filtering and lowers the digital sampling rate. For example, the decimation filter may lower the sampling rate from 26 MHz (the sampling rate of the input of the demodulator) to 3.25 MHz (the sampling rate of the output of the demodulator).

Figure 5:
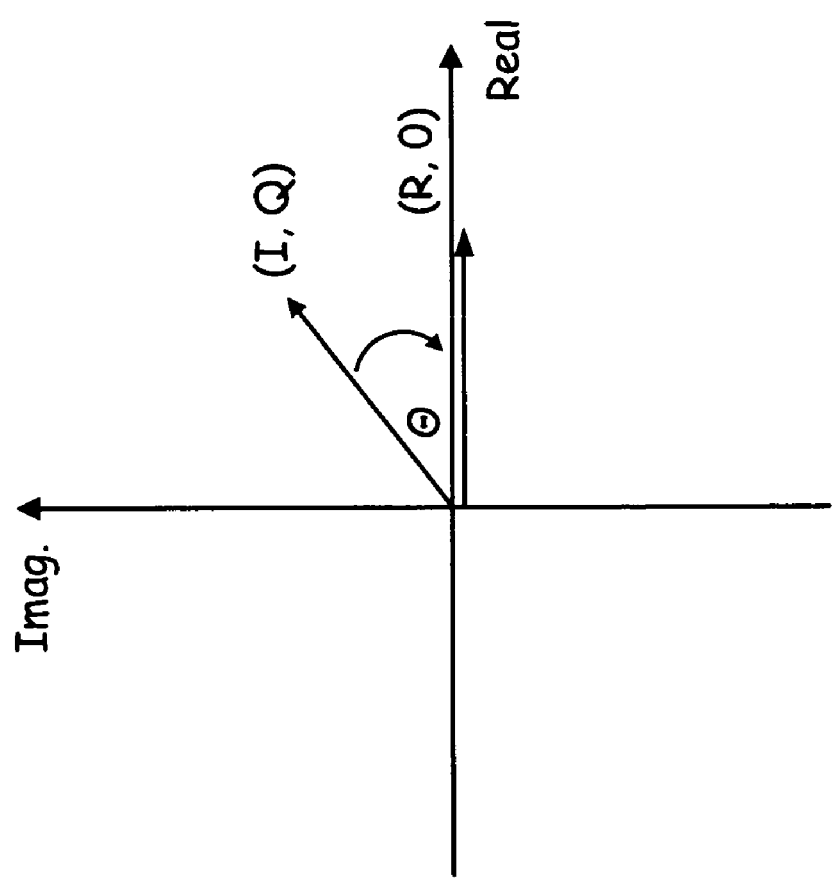
FIG. 5 is a graph illustrating the an exemplary vector de-rotation performed by the demodulator according to one embodiment of the present invention.

The first and second digital filtered signals 328 and 332, respectively, are input to the vector de-rotator 335 to de-rotate the I and Q vector digital data. For example, in one embodiment, the vector de-rotator 335 may be a coordinate rotation digital computer (CORDIC) that de-rotates the complex input vector back down to the real axis to produce a digitized baseband signal 338 representing the angle and magnitude of the complex input vector. FIG. 5 is a graph illustrating an exemplary output of a CORDIC. In FIG. 5, the output angle is normalized to the range $[-\pi; +\pi]$. In one embodiment implementing a frequency shift keying (FSK) demodulator, the CORDIC calculates the angle of the complex input vector to 10-bit precision.

Referring again to FIG. 3, the output of the vector de-rotator 335 is input to a phase locked loop 340 that operates to demodulate the digitized baseband signal 338 to produce a demodulated digital signal 342. The demodulated digital signal 342 includes digital baseband bits representative of the original outgoing digital data processed by the baseband processor. The smoothing filter 345 is connected to receive the demodulated digital signal 342, and is operable to apply a smoothing function to the demodulated digital signal to produce a smoothed signal 348. The slicer 355 samples the smoothed signal 348 and outputs a sine wave as digital binary data 358. The digital data bits 358 are input to a digital processor 370 to mitigate the effects of various imperfections in the radio processor circuitry, as is known in the art.

The operation of the digital processor 370 is controlled by the timing recovery circuit 360. The timing recovery circuit 360 is connected to receive a control signal TxOn from the baseband processor. The control signal TxOn indicates the presence of valid data on the input signal lines (Tx_I and Tx_Q). When the control signal TxOn goes high, indicating the presence of valid data on the input signal lines, the timing recovery circuit 360 outputs a strobe signal 365 to activate the digital processor 370. The timing recovery circuit 360 is configured to delay the output of the strobe signal 365 by an amount of time necessary to synchronize the sampling of the digital data bits 358 by the digital processor 370 with the generation of data by the baseband processor. Thus, a fixed timing relationship exists between the presence of valid data in the input signal lines Tx_I and Tx_Q and the generation of the strobe signal 365 by the timing recovery circuit 360.

Figure 6:
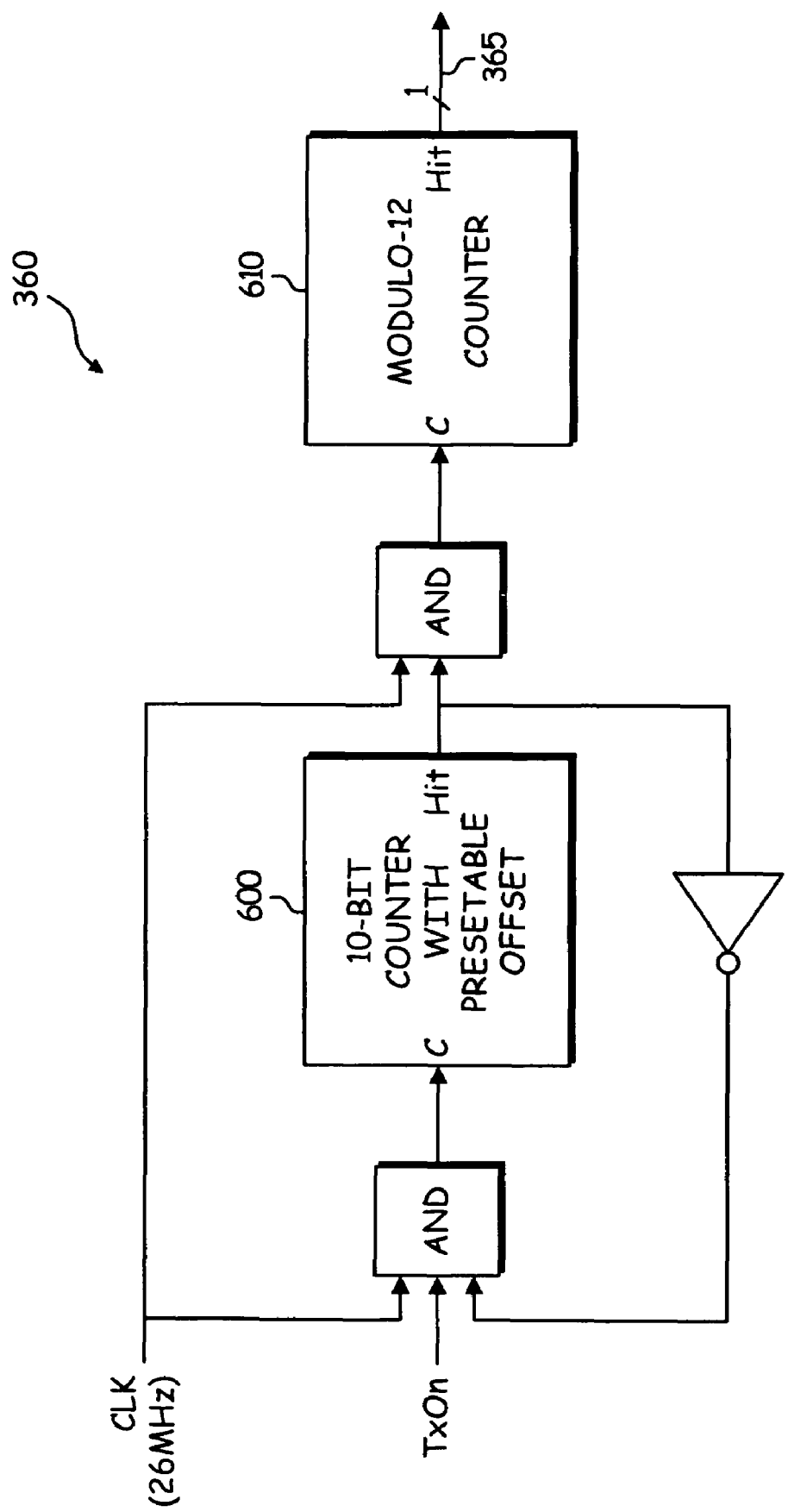
FIG. 6 is a schematic block diagram illustrating an exemplary timing recovery circuit for use in the radio processor according to one embodiment of the present invention.

FIG. 6 is a schematic block diagram illustrating an exemplary timing recovery circuit 360 for use in the radio processor according to one embodiment of the present invention. The timing recovery circuit 360 includes a 10-bit counter 600 and a modulo-12 counter 610. The 10-bit counter 600 is programmed with a predetermined offset to synchronize the sampling of the demodulator output with the presence of valid data at the demodulator output. For example, when the control signal TxOn goes high, the 10-bit counter 600 is incremented with each clock pulse until the counter 600 reaches the predetermined offset. When the 10-bit counter 600 overflows, the 10-bit counter 600 outputs a control signal to the modulo-12 counter 610. The modulo-12 counter 610 generates a read strobe signal 365 that is input to the digital processor to enable the digital processor to read the digital data bits in the output of the demodulator at optimal times corresponding to peak data values. As a result, the digital processor can be optimized to process the demodulated signal at optimal times of the slicer output.

Figure 7:
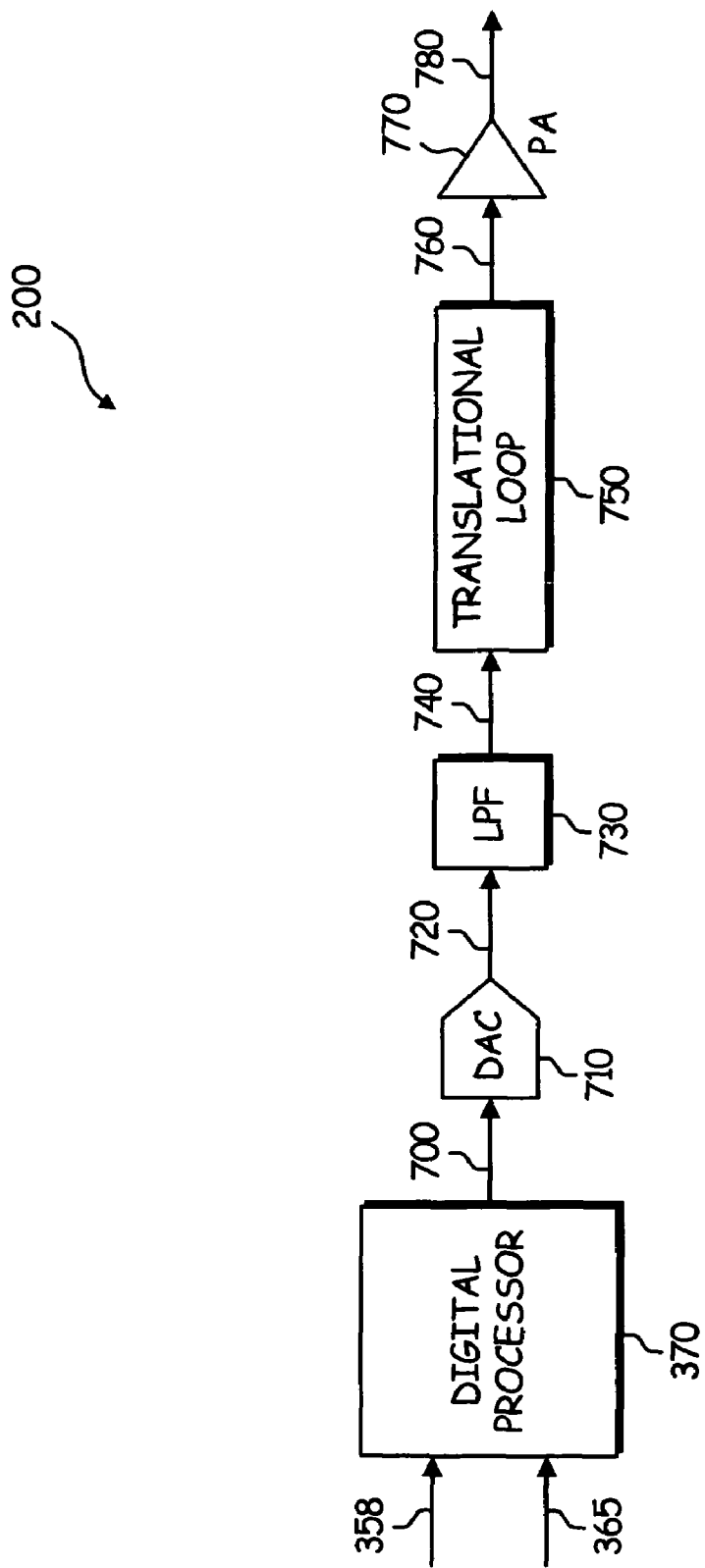
FIG. 7 is a circuit schematic illustrating a digital processor and RF transmitter circuitry of a radio processor according to one embodiment of the present invention.

FIG. 7 is a circuit schematic illustrating the digital processor 370 and subsequent RF transmitter circuitry of a radio processor 200 according to one embodiment of the present invention. The demodulated digital signal 358, including the digital data bits output from the slicer, are input to the digital processor 370, along with the strobe signal 365. The digital processor 370 processes the demodulated digital signal 358 to mitigate the effects of imperfections in the analog RF transmitter circuitry. The digital processor 370 further re-modulates the data in accordance with the particular wireless communication standard to produce a processed modulated digital signal. In one embodiment, the digital processor 370 processes the demodulated digital signal 358 at optimal times based on the receipt of the strobe signal 358. The output of the digital processor is a digitized modulated low frequency signal 700. The digitized modulated low frequency signal 700 is converted by a DAC 710 to produce an analog modulated low frequency signal 720 and is low-pass filtered by an LPF 730 to create a continuous waveform low frequency signal 740. A translational loop 750 is then used to up-convert the continuous waveform low frequency signal 740 to a radio frequency signal 760 at the desired radio transmission frequency. The radio frequency (RF) signal 760 is amplified by a power amplifier 770, and the amplified RF signal 780 is transmitted over an antenna (not shown) to a targeted device, such as a base station, an access point and/or another wireless communication device.

Figure 8:
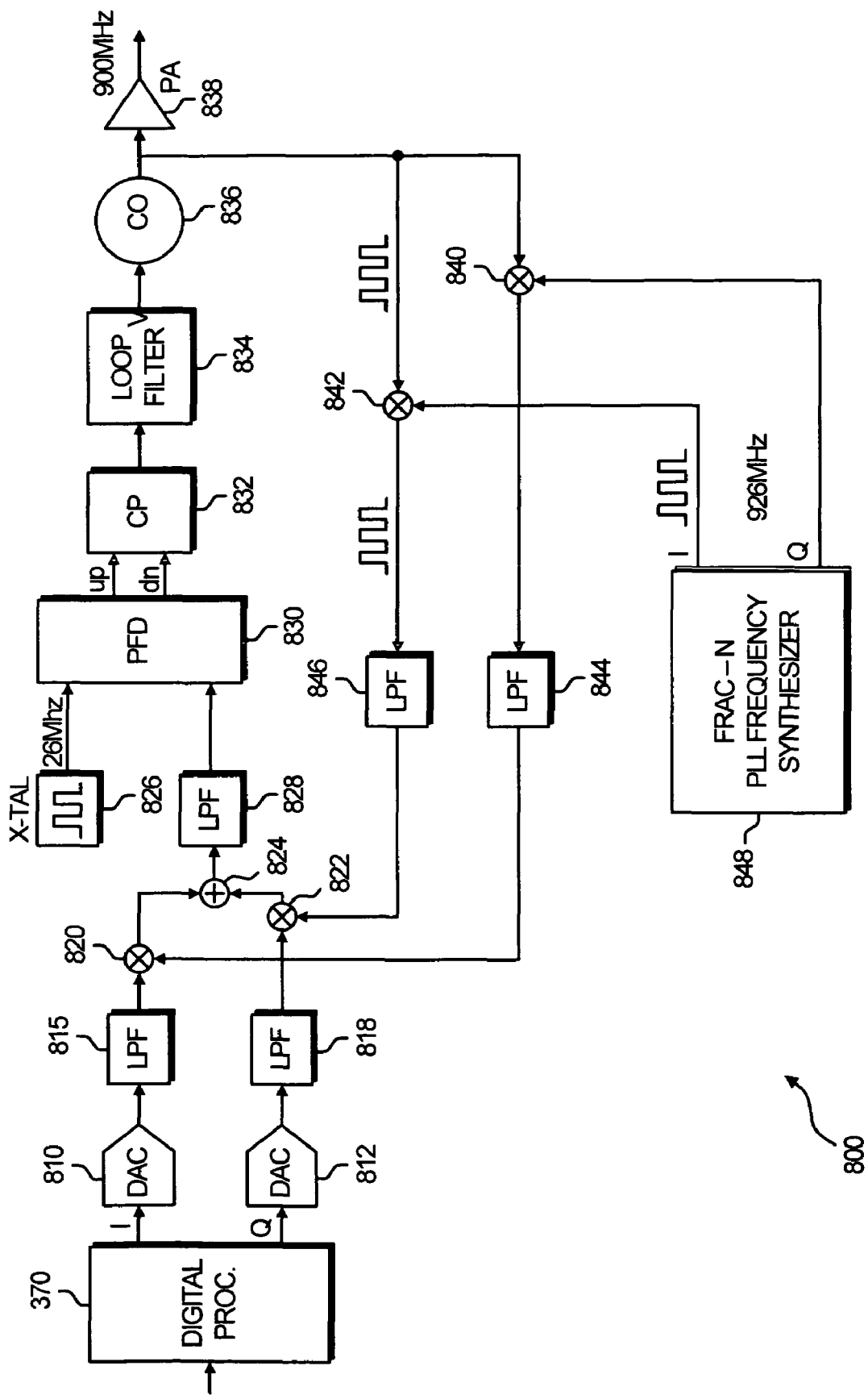
FIG. 8 illustrates a translational loop RF transmitter for use in the radio processor according to one embodiment of the present invention.

FIG. 8 illustrates a translational loop RF transmitter 800 for use in the radio processor according to one embodiment of the present invention. In a translational loop, the desired modulated spectrum is generated as some low IF or baseband signal and then is translated to the desired RF using a PLL. In applications with non-constant envelope modulation, a parallel path for amplitude variation modulates the output power amplifier to generate the desired amplitude variation.

The transmitter of FIG. 8 includes a digital processor 370 (as discussed above), in-phase and quadrature digital-to-analog converters (DACs) 810 and 812, corresponding low-pass re-construction filters 815 and 818, and analog baseband mixers 820 and 822. A summing node 824 combines the mixer outputs, which are followed by low-pass filtering at LPF 828. The remaining components of the transmitter are a phase and frequency detector (PFD) 830, a 26 MHz crystal reference 826, a charge pump 832, a loop low-pass filter (Loop Filter) 834, a voltage controlled oscillator (VCO) 836 and a pair of offset mixers 840 and 842, as well as corresponding low-pass filters (LPFs) 844 and 846. Radio frequency channel selection is achieved by employing a fractional-n (FRAC-N) frequency synthesizer 848.

A qualitative description of the operation of the translational loop is as follows. The sum of the mixing products of the baseband I & Q components with down-converted RF output I & Q components are low-pass filtered to generate a 26 MHz sinusoid whose excess phase component equals the difference between the desired baseband phase signal and the RF output phase signal. The 26 MHz IF is extracted by the PFD 830 whose output is the phase error signal. As in any other properly designed PLL, the closed loop action of the loop causes the error signal to approach zero; hence, the phase of the RF output tracks the phase of the baseband signal, as desired.

More specifically, the PFD 830 produces control signals to a charge pump (CP) 832 that, responsive to the control signals, produces a corresponding error current signal. The loop filter 834 is coupled to receive the error current signal and to produce a corresponding error voltage signal to the VCO 836. The VCO 836 produces an oscillation, which here also is the RF transmit signal. In the described embodiment, the RF transmit signal produced by VCO 836 is provided to a power amplifier 838 for amplification and radiation from an antenna.

As an example, assume that VCO 836 produces an output frequency oscillation of 900 MHz as the RF transmit signal. The 900 MHz signal is further produced to a pair of mixers 840 and 842 that are further coupled to receive a 926 MHz signal from a FRAC-N phase locked loop (PLL) frequency synthesizer 848. As is known by one of average skill in the art, mixers 840 and 842 multiply or mix the two input signals, here 900 MHz and 926 MHz, to produce a 26 MHz output signal. Each 26 MHz output signal is low pass filtered by LPF's 844 and 846 and mixed with respective I or Q input signals by corresponding mixers 820 and 822.

Figure 9:
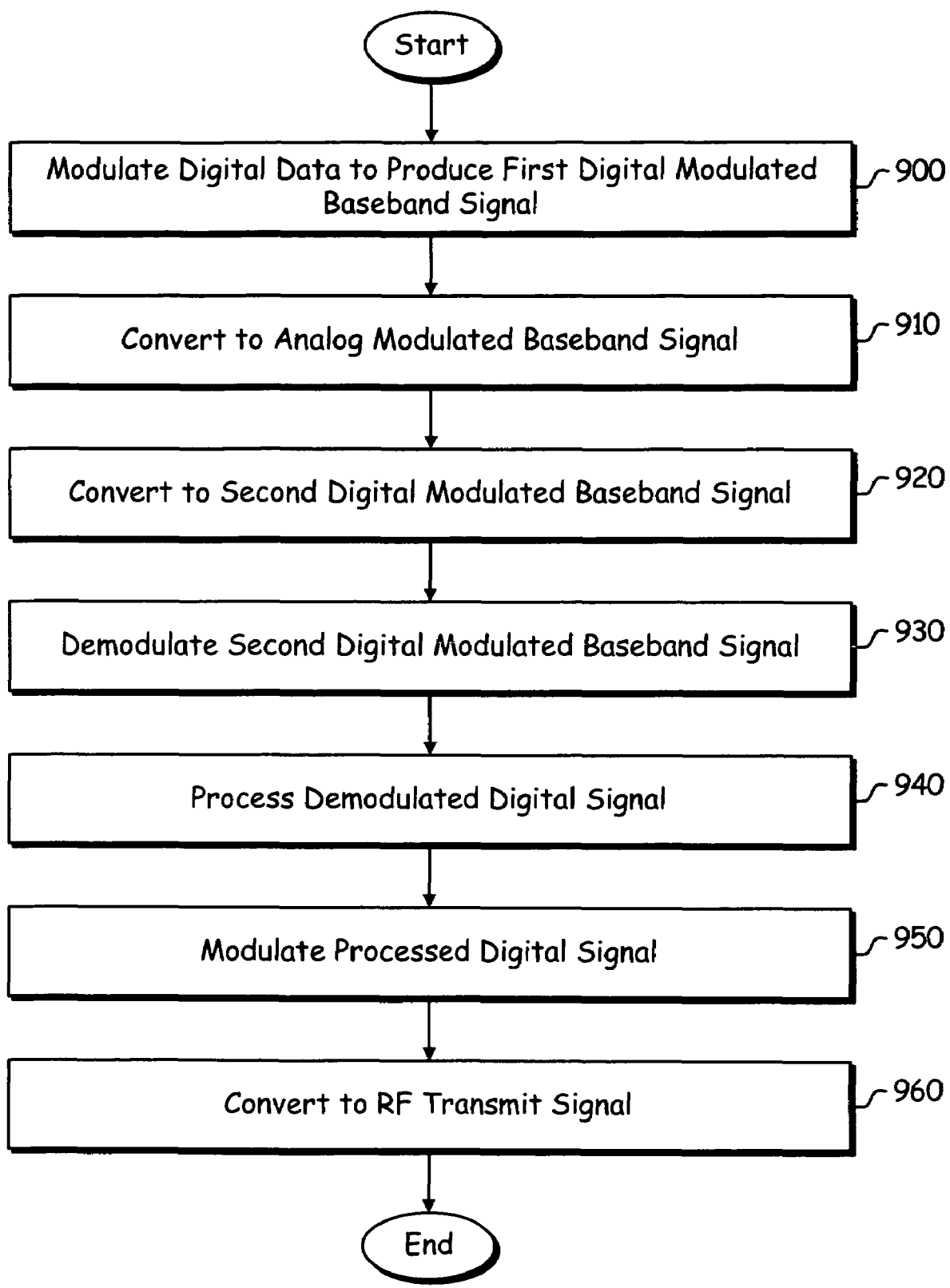
FIG. 9 is a flowchart illustrating one method of the present invention.

FIG. 9 is a flowchart illustrating one method of the present invention. A radio transmitter includes a baseband processor that modulates digital data to produce a first digital modulated baseband signal (step 900). The first digital modulated baseband signal is then converted to an analog modulated baseband signal and output to a radio processor (step 910). The radio processor converts the analog modulated baseband signal back into a second digital modulated baseband signal (step 920) and demodulates the second digital modulated baseband signal to produce a demodulated digital signal (step 930). Thereafter, the demodulated digital signal is processed to mitigate the effects of imperfections in the analog RF transmit circuitry (step 940) and re-modulated to produce a processed modulated digital signal (step 950). Finally, the processed modulated digital signal is converted to a Radio Frequency (RF) transmit signal by the RF transmit circuitry (step 960) for transmission via an antenna to a target device.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A radio frequency (RF) transmitter, comprising:
a baseband processor for digitally processing outgoing data, wherein the baseband processor is operable to produce an analog complex modulated baseband signal; and
a radio processor, including:
a complex analog-to-digital converter (ADC) connected to receive the analog complex modulated baseband signal, wherein the analog-to-digital converter is operable to convert the analog complex modulated baseband signal to a digital complex modulated baseband signal;
a demodulator connected to receive the digital complex modulated baseband signal, wherein the demodulator is operable to demodulate the digital complex modulated baseband signal to produce a demodulated digital signal;
a digital processor connected to receive the demodulated digital signal, wherein the digital processor is operable to process the demodulated digital signal to produce a processed modulated digital signal;
a digital-to-analog converter (DAC) connected to receive the processed modulated digital signal, wherein the DAC is operable to convert the processed modulated digital signal to a continuous waveform signal;
a filter connected to receive the continuous waveform signal, wherein the filter is operable to produce a filtered signal, and
a translational loop connected to receive the filtered signal, wherein the translational loop is operable to convert the filtered signal to a Radio Frequency (RF) transmit signal.

2. The transmitter of claim 1, wherein the analog modulated baseband signal includes an in-phase signal and a quadrature phase signal, and wherein the complex ADC includes:
a first analog-to-digital converter (ADC) connected to receive the in-phase signal, wherein the first ADC is operable to convert the in-phase signal to a first digital signal; and
a second ADC connected to receive the quadrature-phase signal, wherein the second ADC is operable to convert the quadrature-phase signal to a second digital signal.

3. The transmitter of claim 2, wherein at least one of the first analog-to-digital converter and the second analog-to-digital converters is a delta-sigma ADC.

4. The transmitter of claim 2, wherein the demodulator further includes:
- a first low pass filter connected to receive the first digital signal, wherein the first low pass filter is operable to filter the first digital signal to produce a first filtered digital signal; and
- a second low pass filter connected to receive the second digital signal, wherein the second low pass filter is operable to filter the second digital signal to produce a second filtered digital signal.

5. The transmitter of claim 4, wherein at least one of the first low pass filter and the second low pass filter is a decimation filter operable to filter quantization noise and decrease a sample rate of a respective one of the first digital signal or the second digital signal.

6. The transmitter of claim 4, wherein the demodulator further includes:
- a vector de-rotator connected to receive the first filtered digital signal and the second filtered digital signal, wherein the vector de-rotator is operable to vector de-rotate the first filtered digital signal and the second filtered digital signal to produce a digitized baseband signal.

7. The transmitter of claim 6, wherein the vector de-rotator is a coordinate rotation digital computer (CORDIC) module.

8. The transmitter of claim 6, wherein the demodulator further includes:
- a phase locked loop connected to receive the digitized baseband signal, wherein the phase locked loop is operable to demodulate the digitized baseband signal to produce the demodulated digital signal;
- a smoothing filter connected to receive the demodulated digital signal, wherein the smoothing filter is operable to apply a smoothing function to the demodulated digital signal to produce a smoothed digital signal; and
- a slicer connected to receive the smoothed digital signal, wherein the slicer is operable to sample the smoothed digital signal to produce digital data.

9. The transmitter of claim 8, wherein the radio processor further includes:
- a timing recovery circuit connected to receive a control signal, wherein the timing recovery circuit is operable to activate the digital processor based on a fixed timing relationship between receipt of the control signal at the timing recovery circuit and receipt of the digital complex modulated baseband signal at the demodulator, wherein an output of the timing recovery circuit enables the digital processor to read the digital data at a time corresponding to an optimal output of the slicer.

10. A method for digitally modulating a signal for transmission over an air interface, comprising the steps of:
- modulating digital output data to produce a first digital complex modulated baseband signal;
- converting the first digital complex modulated baseband signal to an analog complex modulated baseband signal;
- converting the analog complex modulated baseband signal to a second digital complex modulated baseband signal;
- demodulating the second complex digital baseband signal to produce a demodulated digital signal;
- processing the demodulated digital signal to produce a processed modulated digital signal; and
- converting the processed modulated digital signal to a Radio Frequency (RF) transmit signal.

11. The method of claim 10, wherein the analog complex modulated baseband signal includes an in-phase signal and a quadrature phase signal, and wherein the step of converting the analog complex modulated baseband signal to a second digital complex modulated baseband signal comprises the steps of:
- converting the in-phase signal to a first digital signal by a first analog-to-digital converter (ADC); and
- converting the quadrature-phase signal to a second digital signal by a second ADC.

12. The method of claim 11, wherein the step of demodulating further comprises the steps of:
- filtering the first digital signal to produce a first filtered digital signal;
- filtering the second digital signal to produce a second filtered digital signal;
- vector de-rotating the first filtered digital signal and the second filtered digital signal to produce a digitized baseband signal;
- demodulating the digitized baseband signal to produce the demodulated digital signal;
- applying a smoothing function to the demodulated digital signal to produce a smoothed digital signal; and
- sampling the smoothed digital signal to produce digital data.

13. The method of claim 12, further comprising the step of:
- activating the step of processing based on a fixed timing relationship between receipt of a control signal and receipt of the analog complex modulated baseband signal.

14. The method of claim 13, wherein the step of processing further comprises the step of:
- optimally reading the digital data.

* * * * *